3,349,036
CLEANING COMPOSITION
Arthur W. Campbell, Terre Haute, Ind., assignor to Vego Chemical Corporation, Terre Haute, Ind.
No Drawing. Filed Oct. 20, 1965, Ser. No. 499,052
2 Claims. (Cl. 252—101)

The present invention relates to the inhibition of the corrosive action of aqueous nitric acid on metals. More particularly, it relates to the inhibition of the corrosive action of aqueous nitric acid on aluminum and iron.

It is well known that aqueous nitric acid is highly corrosive toward metals such as aluminum and iron. This fact has made the use of nitric acid difficult or even impossible in many places where it would otherwise have great utility. Its corrosiveness has also made its storage and transportation an important problem.

Nitric acid is ordinarily shipped and stored in the form of a 70% aqueous solution but is usually used in somewhat more dilute aqueous concentrations. It is a powerful oxidizing agent and attacks most metals, usually with the production of a nitrate or hydrated oxide of the metal and one of the oxides of nitrogen, or occasionally with the production of ammonium salts. Its action on metals usually depends upon such factors as the temperature, strength of the acid, and the nature of the products of the reaction. Thus, in some cases the diluted acid acts in the beginning very slowly upon the metal, but as the reaction proceeds the metal dissolves more rapidly up to a certain point and then again diminishes.

Because of its unusual properties, nitric acid has wide utility, as for example, in the manufacture of sulfuric acid, explosives, soluble metal compounds in the form of nitrates, in cleaning compositions and many other places where its oxidative properties are useful.

Because of its wide utility and unusual properties many efforts have been made to overcome some of its disadvantageous properties, as for example, for purposes where it is desirable to have the dilute nitric acid in contact with metals but where action on the metals is not desired. For instance, nitric acid because of its high oxidative properties has been found to be particularly effective in removing organic growth and other incrustations which form on the bottom of boats. Since, however, most small boats at the present time are made of aluminum and iron, toward which dilute nitric acid is highly corrosive, it has not been possible to use this highly effective method of cleaning the bottoms of boats. Numerous other occasions also arise where it is desirable to remove from aluminum and iron surfaces contaminating materials and for which dilute nitric acid gives particularly good results. In none of these cases, however, has it previously been practical to use dilute nitric acid for such purposes because of its high corrosiveness, resulting in severe damage to the metal surfaces, as well as their cleaning.

It has now been discovered in accordance with the present invention that the corrosiveness of dilute nitric acid can be reduced to such an extent that it now becomes practical to use dilute nitric acid as a cleaning agent for aluminum and iron surfaces, as well as for other purposes, whereby effective cleaning is effected without damage to the metal. Dilute nitric acid inhibited by the process of the present invention can even be conducted through conduits constructed of aluminum or iron, or even be stored in containers made of such metals for reasonable periods of time, without substantial corrosive effect upon the metals. This desirable effect is obtained by incorporating in the dilute aqueous nitric acid small amounts of sulfamic acid, ranging from 0.25, or less to 20.0%, preferably within the range of 0.25 to 5.0% by weight, based on 70% nitric acid. While higher amounts are effective no additional inhibiting effect is generally obtained by the use of larger amounts of sulfamic acid. While, in general, complete inhibition is not obtained, the corrosiveness of the nitric acid is materially reduced in this manner so that dilute acid can be handled in manners not previously possible.

In carrying out the present invention it is only necessary to incorporate into the dilute aqueous nitric acid the amount of sulfamic acid required to reduce the corrosiveness thereof. In order to be effective in reducing corrosion the sulfamic acid must be soluble in the nitric acid at least to the extent required as a corrosion inhibitor. In the case of concentrated (70%) nitric acid, for example, sulfamic acid is not sufficiently soluble to have any practical degree of inhibitory effected hence the sulfamic acid is effective only in reducing the corrosive effects of dilute nitric acid. It has been found also that with quite dilute nitric acid the degree of corrosiveness of nitric acid towards certain metals is materially reduced without the use of an inhibitor and that at such dilutions the effect of sulfamic acid is not so noticable as at somewhat higher concentrations. The use of sulfamic acid as a corrosion inhibitor in aqueous nitric acid solutions appears to be most effective within the range of 5% to 35% aqueous nitric acid.

Table I below shows the reduction of the corrosiveness of different dilutions of aqueous nitric acid toward aluminum using different amounts of sulfamic acid. The results are given in terms of percent loss in weight of strips of aluminum after immersion for two hours at room temperature.

*Table I*

| Sulfamic Acid as percent of 70% $HNO_3$ | Corrosion by— | | |
|---|---|---|---|
| | 17.5% $HNO_3$ | 23.3% $HNO_3$ | 35% $HNO_3$ |
| 0.25 | 0.24 | 0.62 | 0.166 |
| 0.50 | 0.098 | | |
| 1.0 | 0.093 | 0.11 | |
| 2.0 | 0.075 | 0.15 | 0.11 |
| 5.0 | 0.15 | 0.07 | 0.096 |
| 10.0 | 0.148 | | |
| 20.0 | 0.124 | | |
| | 0.13 | | |

A similar experiment using 17.5% nitric acid containing 5% of sulfamic acid (based on 70% nitric acid) showed after 2 hours action on iron 8.5% solution of the iron as compared to 11.13% for the control containing no sulfamic acid.

Aqueous nitric acid of 17.5% concentration has been found to be particularly effective in cleaning incrustations forming on the bottoms of aluminum boats left for extended periods of time in the water. Because of the corrosiveness of the acid, however, it has not previously been possible to use dilute nitric acid for such cleaning operations. Table II below shows the results of an experiment run to show the use of dilute aqueous nitric acid for this purpose wherein sulfamic acid was used to reduce the corrosiveness of the nitric acid applied to aluminum boat metal as a cleaner. In the experiment 17.5% aqueous nitric acid was used with varying amounts of sulfamic acid. The results are given in terms of percent by weight of the aluminum boat metal dissolved after immersion at room temperature for 2 hours.

Table II

| Sulfamic acid as percent of 70% $HNO_3$: | Corrosion, percent |
|---|---|
| 0 | 0.24 |
| 2 | 0.15 |
| 5 | 0.15 |
| 10 | 0.12 |
| 20 | 0.13 |

The incrustations were removed from the metal leaving it bright and shiny.

The above degree of reduction of the corrosiveness of dilute aqueous nitric acid toward aluminum metal results in making dilute aqueous nitric acid inhibited with sulfamic acid both effective and practical as a cleaning composition for aluminum and compositions thereof.

What is claimed is:

1. A cleaning composition for aluminum boat bottoms consisting essentially of aqueous nitric acid of concentration ranging from 5.0 to 35.0% by weight, $HNO_3$ content and 0.25 to 20.0% by weight, of sulfamic acid, based on the $HNO_3$ content of the composition.

2. The method of removing incrustations forming on the bottoms of aluminum boats left for extended periods of time in water which comprises applying to said incrustations a composition consisting essentially of aqueous nitric acid of 5.0 to 35%, by weight, $HNO_3$ content and from 0.25 to 20.0%, by weight, of sulfamic acid, based on the $HNO_3$ content of the composition.

References Cited

UNITED STATES PATENTS

| 2,995,027 | 10/1960 | Newell et al. | 252—79.3 X |
| 3,055,739 | 9/1962 | Doss | 252—101 X |
| 3,196,113 | 7/1965 | Ponchel | 252—101 X |

FOREIGN PATENTS

| 896,159 | 5/1962 | Great Britain. |
| 1,156,291 | 10/1963 | Germany. |

LEON D. ROSDOL, *Primary Examiner.*

M. WEINBLATT, *Assistant Examiner.*